US00RE42271E

(19) United States
(12) Reissued Patent
Kusnitz et al.

(10) Patent Number: US RE42,271 E
(45) Date of Reissued Patent: Apr. 5, 2011

(54) WIRELESS TELEPHONE SYSTEM INCLUDING VOICE OVER IP AND POTS

(75) Inventors: Jeffrey A. Kusnitz, Campbell, CA (US); James J. Sliwa, Raleigh, NC (US)

(73) Assignee: International Business Machines Corporation, Armonk, NY (US)

(21) Appl. No.: 12/574,839

(22) Filed: Oct. 7, 2009

Related U.S. Patent Documents

Reissue of:
(64) Patent No.: 7,590,106
Issued: Sep. 15, 2009
Appl. No.: 12/258,953
Filed: Oct. 27, 2008

U.S. Applications:

(63) Continuation of application No. 10/669,314, filed on Sep. 23, 2003, now Pat. No. 7,492,758.

(51) Int. Cl.
*H04L 12/66* (2006.01)
*H04M 1/00* (2006.01)
*H04M 3/44* (2006.01)
*H04B 1/38* (2006.01)

(52) U.S. Cl. ..... 370/353; 370/401; 379/201.02; 379/216.01; 379/355.02; 379/355.03; 379/355.04; 455/414.1; 455/552.1; 455/561

(58) Field of Classification Search ..... 370/352, 370/353, 356, 401; 379/201.01, 201.02, 216.01, 379/355.02–355.04; 455/466, 552.1, 560, 455/561

See application file for complete search history.

(56) References Cited

U.S. PATENT DOCUMENTS 5,036,531 A 7/1991 Spear
5,533,019 A 7/1996 Jayapalan
5,588,039 A 12/1996 Ohkubo et al.
5,590,174 A 12/1996 Tsuji et al.
5,590,398 A 12/1996 Matthews
5,594,777 A 1/1997 Makkonen et al.
5,910,946 A 6/1999 Csapo
5,933,774 A 8/1999 Bertocci
6,115,598 A 9/2000 Yu
6,131,043 A 10/2000 Shimizu
6,134,235 A * 10/2000 Goldman et al. ..... 370/352
6,205,135 B1 3/2001 Chinni et al.
6,222,829 B1 4/2001 Karlsson et al.
6,295,457 B1 9/2001 Narayanaswamy
6,351,464 B1 2/2002 Galvin et al.
6,456,616 B1 9/2002 Rantanen
6,539,225 B1 3/2003 Lee
6,556,821 B1 4/2003 Lindgren et al.
6,584,317 B2 6/2003 Mukerjee et al.
6,597,686 B1 * 7/2003 Smyk ..... 370/352

(Continued)

*Primary Examiner*—Harry S Hong
(74) *Attorney, Agent, or Firm*—Marcia L. Doubet; Steven W. Roth

(57) ABSTRACT

A telephone capable of placing or receiving calls over the PSTN or a packet network. The telephone can store multiple telephone numbers for each potential called party along with preferences that govern the order of selecting telephone numbers to service any given outgoing call. Some or all of the telephone numbers can be associated with a presence service. Presence indicators stored in the telephone are dynamically updated via the packet network connection and are used as part of the telephone number selection algorithm. The preferred embodiment is a wireless system having a base station and a remote device.

10 Claims, 4 Drawing Sheets

U.S. PATENT DOCUMENTS

| | | | |
|---|---|---|---|
| 6,600,925 | B1 | 7/2003 | Rams |
| 6,731,629 | B1 | 5/2004 | Patel et al. |
| 6,865,391 | B1 | 3/2005 | Oh et al. |
| 6,879,833 | B2 | 4/2005 | Oh et al. |
| 6,889,045 | B2 | 5/2005 | Pan et al. |
| 6,928,067 | B1 | 8/2005 | Hameleers et al. |
| 6,957,060 | B1 | 10/2005 | Sharp |
| 7,024,198 | B2 | 4/2006 | Knaebchen et al. |
| 7,047,012 | B1 | 5/2006 | Gerszberg et al. |
| 7,058,415 | B2 | 6/2006 | Bushnell et al. |
| 7,089,011 | B1 | 8/2006 | Mangal |
| 7,092,712 | B2 | 8/2006 | Holmes et al. |
| 7,139,577 | B1 | 11/2006 | Morper |
| 7,209,457 | B1 | 4/2007 | Leuca et al. |
| 7,336,948 | B1 | 2/2008 | Maler |
| 7,447,217 | B2 | 11/2008 | Knaebchen |
| 7,450,939 | B2 | 11/2008 | Scheinert |
| 7,492,758 | B2 | 2/2009 | Kusnitz et al. |
| 2002/0029142 | A1 | 3/2002 | Koo |
| 2002/0075306 | A1 | 6/2002 | Thompson et al. |
| 2003/0013442 | A1 | 1/2003 | Holmes et al. |
| 2003/0040310 | A1 | 2/2003 | Barakat et al. |
| 2003/0144030 | A1 | 7/2003 | Newmark |
| 2003/0176180 | A1 | 9/2003 | Deinzer |
| 2004/0009787 | A1 | 1/2004 | Oh et al. |
| 2004/0052245 | A1 | 3/2004 | Kwon |
| 2005/0043044 | A1 | 2/2005 | Ashour |
| 2005/0096024 | A1 | 5/2005 | Bicker et al. |
| 2005/0119016 | A1 | 6/2005 | Neumann |
| 2005/0124386 | A1 | 6/2005 | Oh et al. |
| 2005/0239470 | A1 | 10/2005 | Gerszberg et al. |
| 2006/0079223 | A1 | 4/2006 | Trinkel et al. |
| 2006/0160565 | A1 | 7/2006 | Singh et al. |
| 2007/0280252 | A1 | 12/2007 | Chuang |
| 2008/0003952 | A1 | 1/2008 | Sjostrom et al. |
| 2008/0279175 | A1 | 11/2008 | Bobier |
| 2009/0238147 | A1 | 9/2009 | Bicker et al. |

* cited by examiner 100
102
BASE
STATION
104
PSTN
106
VOIP
PRESENCE
108 LAN
112
ROUTER
114
INTERNET
110

BASE
200
102
212
PACKET
INTERFACE
214
TCP/IP
STACK
216
NETWORK
CONNECTOR
106
228
IM CLIENT
202
TRANSMITTER/
RECEIVER
210
SWITCH
218
POTS
INTERFACE
220
POTS
CONNECTOR
104
206
FIRM
WARE
204
CPU
208
KEYPAD
224
NAME LIST
226
PRESENCE
TABLE
222

CONFIGURATION MENU

EDIT NAME LIST

SELECT TOD PREFERENCES

SELECT AREA CODE PREFERENCES

SET NUMBER OF RINGS

FIG. 5 - BASE NAME LIST 504 506

| 500 NAME | 502 NUMBER | P | C | 508 IM | 510 ID |
|---|---|---|---|---|---|
| JOHN DOE | 919-260-1231 | N | Y | | |
| JOHN DOE | 919-530-4354 | Y | N | AIM | JOHNDOE |
| JOHN DOE | 919-530-4354 | N | N | YAHOO | JDOE |
| JOHN DOE | 919-530-4354 | N | N | SAMETIME | JD@US.IBM.COM |
| JD | 919-530-4165 | N | N | | |
| JANE SMITH | 714-512-0345 | Y | N | | |
| FRED JONES | 919-260-4643 | Y | N | MSN | FRED |
| TOM SMITH | 714-555-4296 | N | Y | | |
| TOM SMITH | 714-521-1212 | N | N | AIM | TSMITH45 |
| | | | | | |

FIG. 6 - PRESENCE TABLE

604

| 600 NAME | 602 NUMBER | P |
|---|---|---|
| JOHN DOE | 919-260-1231 | |
| JOHN DOE | 919-530-4354 | Y |
| JOHN DOE | 919-530-4354 | N |
| JOHN DOE | 919-530-4354 | N |
| JD | 919-530-4165 | |
| JANE SMITH | 714-512-0345 | |
| FRED JONES | | Y |
| TOM SMITH | 714-555-4296 | |
| TOM SMITH | 714-521-1212 | Y |
| | | |

FIG. 7 - TOD PREFERENCES

704

706

| 700 START | 702 END | PRI | SEC |
|---|---|---|---|
| 7 AM | 5 PM | VOIP | POTS |
| 5 PM | 11 PM | POTS | VOIP |
| 11 PM | 7 AM | DC | DC |
| | | | |

FIG. 8 - AREA CODE PREFERENCES

804

806

| 800 AC | PRI | SEC |
|---|---|---|
| 919 | VOIP | POTS |
| 925 | POTS | VOID |
| 212 | DC | DC |
| | | |

WIRELESS TELEPHONE SYSTEM INCLUDING VOICE OVER IP AND POTS

Matter enclosed in heavy brackets [ ] appears in the original patent but forms no part of this reissue specification; matter printed in italics indicates the additions made by reissue.

BACKGROUND OF THE INVENTION

TECHNICAL FIELD

The invention relates to a wireless telephone handset and an intelligent base station that connects a call either to the public switched telephone network (PSTN) or to a packet network using Voice over IP (VoIP) based on a per call selection algorithm.

At the present time, it is becoming commonplace for users to communicate via speech using packet networks in lieu of the standard public switched telephone network. Voice over IP (Internet Protocol) is typically used to provide this capability. Users can select from a variety of products including wired VoIP desk sets and wireless systems that use both proprietary protocols between a handset and a base station, as well as the wireless LAN 802.11 protocols. Of course, users can also select from any number of wireless telephones that connect to the PSTN. However, if one wishes to avail him or herself with access to both types of networks, one must acquire a separate system for each, one for VoIP gateway dialing and the other for wireless traditional PSTN dialing, and manually select which system to use on any given telephone call.

SUMMARY OF THE INVENTION

The invention addresses the problems by providing a telephone system that in a first respect is capable of placing or receiving calls over the PSTN or a packet network. The preferred embodiment for packet communications is via the TCP/IP protocol. In a second aspect of the invention, the telephone system has the capability of storing multiple telephone numbers for each potential called party along with preferences that govern the order of selecting telephone numbers to service any given outgoing call. Some or all of the telephone numbers can be associated with a presence service. Cell phone operators already have the ability to collect and distribute presence indicators. Other telephones that are associated with computers can be associated with presence services at the present time. All telephones will no doubt have this capability at some time in the future. For the telephone numbers that are associated with a presence service, presence indicators stored in the telephone system are dynamically updated via the packet network connection and are used as part of the telephone number selection algorithm.

In the preferred embodiment, the telephone system is a wireless system comprising a base station and a handheld mobile device such as a wireless telephone handset or Personal Data Assistant (PDA) equipped with a microphone and speaker. A user of the telephone system configures the system over a Local Area Network (LAN) using a browser at a workstation. The mobile device or the base station could also be equipped as well to perform configuration using either a keypad or voice recognition technology. Configuration includes among other things adding names and telephone numbers to a database in the telephone system. Configuration also includes the selection of a preference algorithm to control the order in which telephone numbers are dialed to attempt connection with a called party and whether any given call is routed first over the packet network or the PSTN. The selection of PSTN or VOIP can be based on many algorithms. In the preferred embodiment, the user can configure the selection of routing by time of day or area code. Certainly, these preference algorithms are intended as examples and not to be limiting. The dynamically adjusted presence indicators, of course, play a large role in the selection of telephone numbers.

BRIEF DESCRIPTION OF THE DRAWINGS

FIG. 5 shows a computer display of a called party names list stored in the base station;

FIG. 6 shows a computer display image of a presence table stored in the base station and associated with potential called parties;

FIG. 7 shows an computer display image of a time-of-day routing preference table stored in the base station and used to select routing of a call over VoIP or POTS telephone lines;

FIG. 8 shows an alternative routing preference table bases on area code rather than time-of-day.

DETAILED DESCRIPTION

Figures 1, 2:
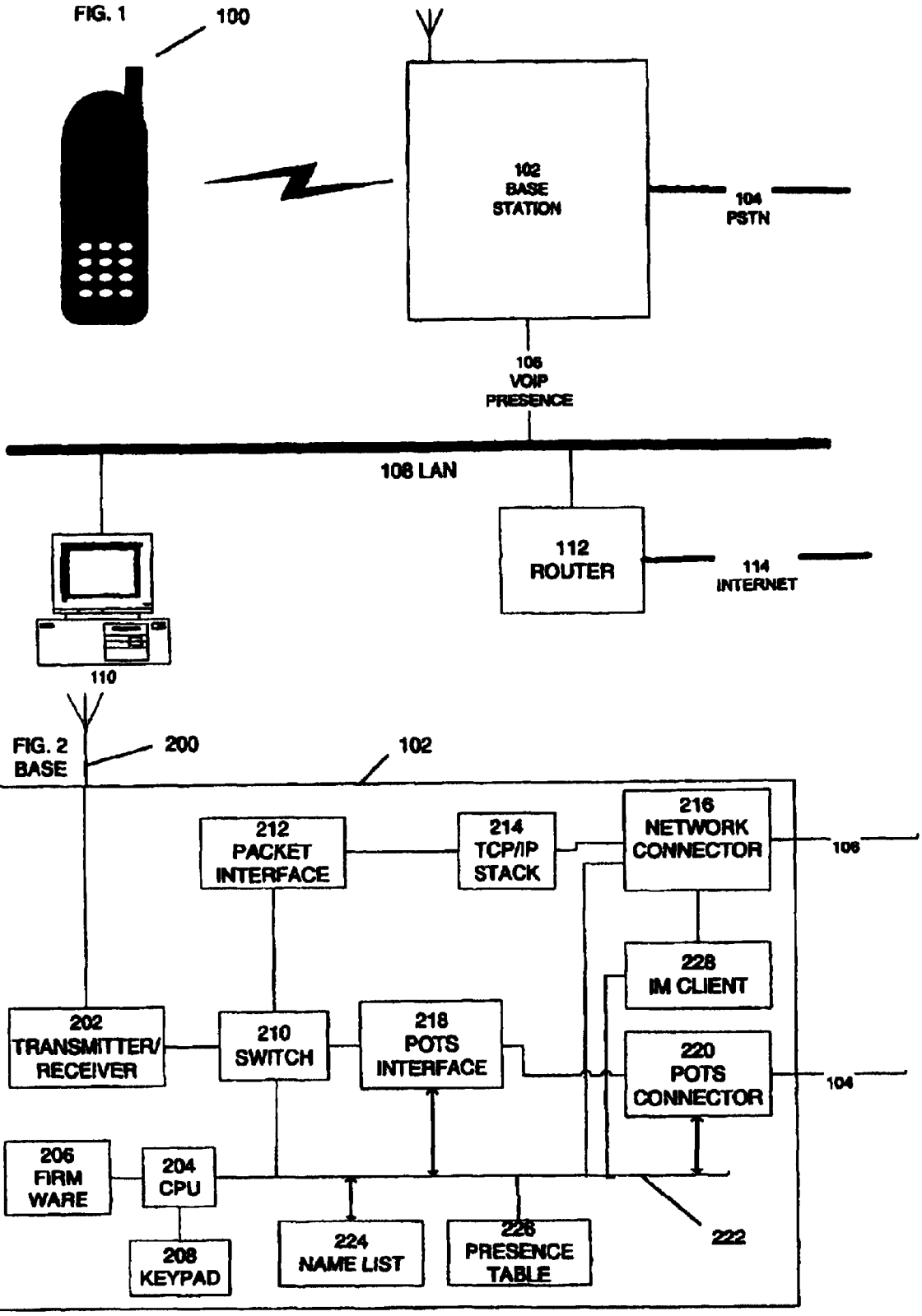
FIG. 1 shows block diagram of a wireless system, including a handset or handheld with a display and an intelligent base station, for practicing the invention.
FIG. 2 shows an illustrative block diagram of the intelligent base station.

FIG. 1 shows a wireless mobile telephone handset 100 that communicates with a base station 102 using well-known wireless protocols. The base station has two ports for communicating with called parties. A first port 104 is a standard telephone connection for communicating with the public switched telephone network (PSTN) for POTS (Plain Old Telephone Service) telephone service. The second port 106 is a standard data connection for communicating with a data network, such as the Internet for telephone communication using Voice over IP (VoIP). In the preferred embodiment, the packet network connection 106 from the base station is connected to an internet 114 using a router 112 that is attached to a LAN 108. LAN 108 also connects to a computer 110 and base station 102. The base system is configured over the LAN 108 using a browser, such as Microsoft Internet Explorer, that is executed in a computer 110 attached to the base station 102 via the LAN 108. This technique of configuring network devices is well known and used typically to configure routers, bridges, etc. The packet connection 106 is also used to receive presence indications associated with potential called parties at designated telephone numbers, as will be explained below. These presence indications arrive from the internet 114 and are forwarded to base station 102 via LAN 108.

FIG. 2 shows an illustrative block diagram of the base station 102. It is equipped with an antenna 200 to communicate wirelessly with the handheld device 100. The antenna 200 is connected to a transmitter/receiver 202 over which digital data is transmitted between the handheld 100 and the base station 102 using wireless telephony protocols. The base station is controlled by a CPU (central processing unit) 204. CPU 204 is controlled by a firmware program and operating system embedded in firmware memory 206. CPU 204 also communicates with other portions of the base station via a data bus 222. The base station can also be equipped with a keypad 208. microphone and speaker (not shown) for additional convenience and functionality.

A switch 210 controls whether the base station communicates with the PSTN or with a data network. In the VoIP state, switch 210 connects the transmitter/receiver 202 to packet interface 212. Packet interface 212 performs the functions necessary to packetize data from the handheld 100 and send it to TCP/IP stack 214; for incoming data from the packet network via connector 216, packet interface 212 de-packetizes the data and sends it to the transmitter/receiver 202.

When switch 210 is in the POTS state, it connects the transmitter/receiver 202 to a POTS interface 218, which is conventional well-known apparatus in commercial use today for PSTN communication via the POTS connector 220.

The wireless system can be an analog system or a digital system. The fundamental technology for either type of system, including the transmitter/receiver 202 and the POTS and packet interfaces is commercially available in chip sets. Conexant, Inc., for example, is a leading manufacturer of wireless telephony digital and analog chips as well as technology for voice over IP.

A name list 224 is maintained in a random-access memory of the base station; the names list contains the names of people that can be called using the list, along with the information necessary to complete the calls. Also in random-access memory is a presence table 226 that contains information regarding the instant presence at specified telephones or devices of people in the names list 224. The name list and presence table are discussed in more detail below. One or more instant messaging (IM) clients 228 are also present in the memory of the base station to maintain the dynamic state of the presence table. The IM clients receive presence information from the Internet via the network connector 216. The IM clients are loaded into the base station using the computer 110 and the LAN 108 connection to the base station.

Figures 3, 4:
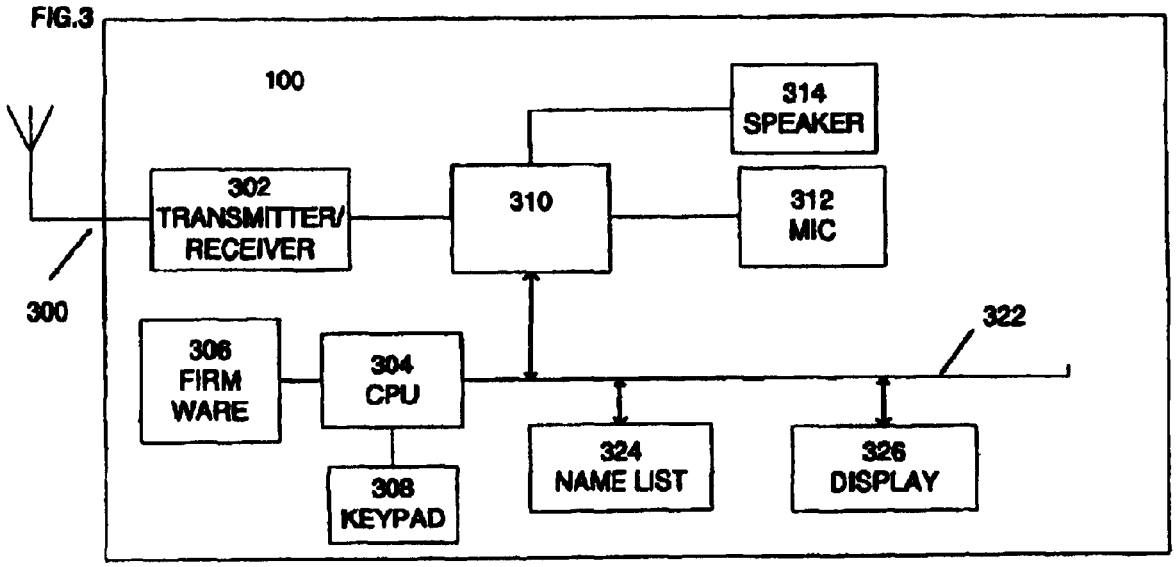
FIG. 3 shows an illustrative block diagram of the handset or handheld of the wireless system.
FIG. 4 shows a screen image of a configuration menu that is displayed on a networked computer in a preferred embodiment of the system, or secondarily on a display of the handset or handheld.

FIG. 3 contains a block diagram of the handheld 100. An antenna 300 communicates with base station 102 and connects to a transmitter/receiver 302 of the handheld. Like the base station, the handheld 100 also contains a CPU 304 controlled by a firmware program and operating system 306. CPU 304 communicates with other equipment in the handheld via a data bus 322. A keypad 308 allows the entry of telephone numbers if that mode of operation is desired by a caller. The handheld also contains a names list 324 in its random-access memory, but unlike the names list 224 in the base station, names list 324 contains only the names in the identical format as stored in the base station names list. Whenever the base station names list 224 is edited, when the user is completed and saves the table, the names only portion of the table is transmitted to the handheld and stored in its names list. When a caller activates the handheld names list 324, its contents are displayed on display 326. The caller can navigate through the list using buttons on the keypad or, with today's technology; a voice recognition chip can easily be used to allow a caller to verbally navigate the names list. The handheld also contains other equipment that is standard in wireless mobile units, illustrated here as 310, that connects to a microphone 312 and speaker 314.

The operation of the system is now described. FIG. 4 shows a sample menu of configuration services that is displayed to a user at computer 110 of FIG. 1. This sample menu contains links for editing the name list, and for configuring time-of-day or area code preferences, and for setting the number of rings that determine when the system abandons a number as unanswered. As mentioned, the preferred way of configuring the base station is by using a browser such as the Microsoft Internet Explorer, although many other modes are possible and contemplated within the scope of the invention. The operating system contained in firmware 206 of the base station contains a server to communicate with the browser software at the computer 110. Name list 224 in the base station is edited by displaying its contents at the browser.

FIG. 5 shows an illustrative screen that is displayed at computer 110 for name entry, display and editing. Each entry of the name list contains a Name field 500, a Number field 502, a Preferred field 504, a Cell field 506, an Instant Message (IM) field 508, and an instant messaging ID field 510. In each entry, the name field 500 contains a person's name in any way that the user wishes to identify the person. The Number field 502 contains a telephone number associated with that person. As shown in the first four entries of the name list of FIG. 5, John Doe has at least four telephone numbers at which he might be reached. If "JD" in the fifth entry refers to the same John Doe, then he has five numbers entered into this list. The Preferred field 504 contains a flag that indicates a preference for a particular number. The Cellular field 506 contains a flag that identifies a number as belonging to a cell phone. The IM field 508 contains an identification of an instant messaging client if there is such a client associated with the particular telephone number. Each such client corresponds to an instance of IM client 228 in FIG. 2. There are presently a number of possible IM services, such as offered by Lotus Sametime, ICQ, Yahoo, AOL and Microsoft's MSN. Some of these services are free and require only a registration via the World-Wide-Web. In FIG. 5, John Doe has registered with three such services; AOL Instant Messaging (AIM), Yahoo and Sametime. Each service is associated with a different telephone number, and each requires a different IM client loaded as an instance of IM Client 228. Each service has a different format for a user identification and the user identification is placed in the ID field 510 of FIG. 5. For example, John Doe's ID for AIM is "JOHNDOE". On the other hand, Sametime uses an internet e-mail address as the user ID. John Doe's e-mail address is jd@us.ibm.com. New entries are created by positioning the cursor in the desired field of the row 512 at the bottom of the screen and typing in the contents of the field. This is a data entry technique that is used by many database programs, such as Microsoft Access for example. The same entry technique is used for the tables shown in FIGS. 6, 7 and 8 as well.

For each entry in the names list (FIG. 5), there is a corresponding entry in the Presence Table, as shown in FIG. 6. The names are shown in FIG. 6, but that is primarily for clarity here; only a number field is actually required in the preferred embodiment. The P (presence) field 604 contains a flag that is set or reset dynamically as a person associated with an IM service logs into and off of the service. A "Y" indicates that a person is logged in at the number associated with the IM service. A "N" indicates that the person is not logged-in; an empty field means that the telephone number is not associated with an IM service. Each presence service generates a presence or non-presence message, along with a telephone number, as its registered members log on and off of a service, and these messages are transmitted in real-time to interested people. Such messages are received over the Internet by an IM Client 228 and communicated to the appropriate entry in the presence table identified by the received number. This is conventional service at this time that differs in operation somewhat with the different services, but RFCs 2778 and 2779 have been proposed by the Internet Engineering Task Force to attempt to establish an operational standard.

The user can establish preferences for the routing of calls. Obviously, there are many alternative ways of defining user preferences. Two alternative preferences arc taught here for illustrative purposes, a time-of-day (TOD) preference, and an area code (AC) preference. A user selects which service he or she wishes by means of the browser menu in FIG. 4. If a user selects TOD preferences, the TOD preferences table in FIG. 7 is displayed by the browser. By way of example, each entry of this table contains a start time field 700, an end time field 702, a primary field 704 and a secondary field 706. The start and end fields of an entry define an interval of time in which the preferred call routing is specified by the primary field 704. If a call is unsuccessful via the preferred route (VoIP or POTS), and if there is a secondary entry, then the call is re-tried via the secondary route. If mere is no entry in the secondary field, this means the user never wants to use that routing in the defined time interval. If a routing field contains a "DC" (don't care) entry, then a call is placed in the associated time interval by the base station making arbitrary selection as to primary and secondary routing.

If the user prefers to route calls according to area code, then the user configures the table shown in FIG. 8, using the menu of FIG. 4. Each entry of the AC table has an AC field 800 that contains a desired area code. The primary field 804 and the secondary field 806 arc used in the same way as described above for TOD preferences.

Figure 9:
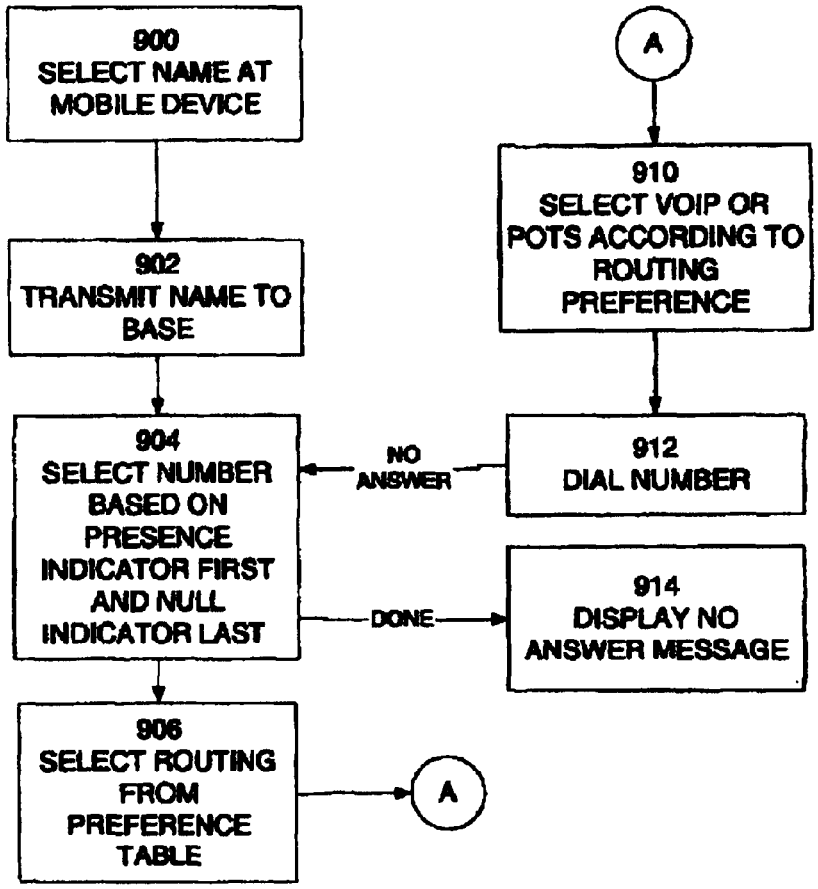
FIG. 9 shows a functional flowchart of the steps that are performed in the course of placing a telephone call from the mobile handset or handheld.

FIG. 9 contains an illustrative functional flowchart of actions performed to place a telephone call. At step 900, a user activates the name list 324 stored in the handheld 100 and navigates to the name of the person he or she wishes to call. The user then initiates the call by depressing a CALL key or equivalent. As a result, the selected name is transmitted to the base station 102 at step 902. The selected name is received at the base station at step 904 and used to search for an entry in the name list 224 of the base station. If the selected name is "John Doe" for example, a preferred name entry is found at the second John Doe entry at telephone number 919-530-4354, as indicated by the Y in the Preferred field 504. This particular number is not associated with a cellular phone, as indicated by the N in the Cellular field 506. However, field 508 indicates that this phone is associated with the AOL IM service AIM. The base station therefore, interrogates the second entry of the Presence table in FIG. 6 to determine if John Doe is present at this telephone location. Field 604 of the presence table indicates that John Doe is present at number 919-530-4354. Therefore, the base station places a call to the preferred number 919-530-4354 for John Doe. If the Presence table had indicated that John Doe was not present (N in field 604) at the preferred number, the base station would then look for an entry for John Doe in the Presence table for which the presence indicator 604 is set. Failing that, the base station would lastly look for a presence entry that is null (neither Y nor N). Such a null state means that there is no presence service associated with the corresponding telephone number. The base station would therefore dial this number last, and of course there may be plural such telephone numbers that might be dialed in sequence until John Doe is located or the list of possible numbers is exhausted. If it is assumed that the Y entry for John Doe in the presence field 604 were in fact a N, then base station 102 would select the number 919-260-1231 from the first entry, because that's the only number at which John Doe might be present.

After a number has been selected at step 904, step 906 interrogates a preference table to determine the routing (VoIP or POTS) of the call. If the user has selected time-of-day (TOD) routing, the TOD table in FIG. 7 is interrogated. Assuming that it is 10 AM in the morning for example, the TOD table indicates (field 704) that VoIP is the primary routing choice. The base station controls switch 210 to select the VoIP path to TCP/IP connector 216 and the call is then placed in a conventional VoIP fashion at step 910. If that call fails for any reason, or if the call is unanswered after a specified number of rings (see FIG. 4 and 912 in FIG. 9), or if the caller initiates a disconnect from the keypad 208, the base station continues to step 914 and examines the secondary routing field 706 of FIG. 7 for a secondary routing (POTS in this example). If a secondary routing is specified, then the base station re-tries the call at 914 using the secondary preference. If the user has not specified a secondary routing preference, as at field 706 of the second TOD entry (5 PM to 11 PM), then the base station will not re-try the call to this particular number. At 916, the base station returns to step 904 to search for another telephone number to try. Eventually, a call will be successful (which is not shown in FIG. 9) or all possibilities will have been exhausted. The preferred embodiment in the latter case displays an appropriate no answer message on the display 326, as illustrated at 920 of FIG. 9, if the call is ultimately unsuccessful.

Artisans in the field of the invention will realize that there are many variations within the spirit and scope of the preferred embodiment. It is the intent of the inventors to encompass these variations to the extent possible according to the state of the relevant art and the law.

We claim:

1. A method for telephone call connecting using a base station and a mobile device, the base station having a first connection to a circuit switched telephone network and a second connection to a packet network and storing one or more telephone numbers associated with each of a plurality of potential called parties and a preference order in which to call the telephone numbers for the potential called parties having more than one telephone number associated therewith, the mobile device adapted for communicating speech to the base station using a wireless protocol and storing names for potential called parties, the method comprising:

selecting, at the base station when one of the stored names is selected for calling at the mobile device, either the first connection or the second connection to service a call from the mobile device based on [the stored preference order] *a route preference* associated with the selected stored name, further comprising selecting the first connection when [a first telephone number in the preference order is associated with the circuit switched telephone] *said route preference so dictates use of a circuit switched network* and the second connection when [the first telephone number is associated with the packet network] *said route preference so dictates use of a packet switched network*.

2. The method of claim 1, wherein the selecting is performed by a switch, and the base station further comprises a packet interface and protocol stack between a first port of the switch and the second connector and a telephone interface between a second port of the switch and the first connector.

3. The method of claim 2, further comprising a central processing unit under control of programmed instructions for controlling the switch to select either the packet interface or the telephone interface to service a call based on whether the telephone number is associated with the packet network or the circuit switched telephone.

4. The method of claim 3, wherein the packet interface converts signals from the mobile device into digital packets compatible with the protocol stack connected to the second connection.

5. The method of claim 3, wherein the packet interface converts packets received from the protocol stack into signals for transmission to the mobile device.

6. The method of claim 3, wherein the telephone interface converts signals from the mobile device into analog signals for transmission to the first connector.

7. The method of claim 3, wherein the telephone interface converts analog signals from the first connector into signals for transmission to the mobile device.

8. The method of claim 2, wherein the protocol stack is a TCP/IP stack.

[9. The method of claim 1, wherein if the calls fails after the first telephone number is called, the selecting selects a second telephone number in the preference order, the selecting configured to select the first connection when the second telephone number in the preference order is associated with the circuit switched telephone and the second connection when the second telephone number is associated with the packet network.]

10. A method for calling a telephone number associated with a selected name from a telephone system base station, based on a preference order associated with the selected name, comprising:

storing one or more telephone numbers associated with each of a plurality of potential called parties and a preference order in which to call the telephone numbers for the potential called parties having more than one telephone number associated therewith, and selecting, at the base station when one of the stored names is selected for calling at a mobile device, either a first connection to a circuit switched telephone network or a second connection to a packet network to service a call from the mobile device based on [the stored preference order] *a preferred route* associated with the selected stored name, wherein selecting either a first connection or a second connection selects the first connection when [a first telephone number in the preference order is associated with the circuit switched telephone and the second connection when the first telephone number is associated with the packet network] *said preferred route dictates use of a circuit switched network and said second connection when said preferred route dictates use of a packet switched network.*

[11. The method of claim 10, further comprising selecting a second telephone number in the preference order if the call fails after the first telephone number is called, wherein selecting either a first connection or a second connection further comprises selecting the first connection when the second telephone number in the preference order is associated with the circuit switched telephone and the second connection when the second telephone number is associated with the packet network.]

*12. A telephone system for placing a call to a telephone number associated with a selected name, said telephone system comprising:*

*a handset, said handset being associated with a base station, said handset having a plurality of names therein, said plurality of names being received at said handset from said base station, said handset being constructed to transmit at least information about said selected name to said base station to initiate said placing of said call, said selected name being one of said plurality of names;*

*said base station comprising,*

*a first connection to a packet network,*

*a second connection to a circuit switched network,*

*a third connection to said handset through which said base station receives said selected name from said handset, and*

*a stored route preference through which said base station determines whether to place said call as a VOIP call using said first connection to a packet network or as a POTS call using said second connection to a circuit switched network, said stored route preference being associated with at least said selected name.*

* * * * *